United States Patent
May et al.

(10) Patent No.: US 11,010,383 B2
(45) Date of Patent: May 18, 2021

(54) HIERARCHY REARRANGE OPERATOR

(71) Applicant: SAP SE, Walldorf (DE)

(72) Inventors: Norman May, Karlsruhe (DE); Robert Brunel, Heidelberg (DE)

(73) Assignee: SAP SE, Walldorf (DE)

( * ) Notice: Subject to any disclaimer, the term of this patent is extended or adjusted under 35 U.S.C. 154(b) by 415 days.

(21) Appl. No.: 15/875,522

(22) Filed: Jan. 19, 2018

(65) Prior Publication Data

US 2019/0130001 A1    May 2, 2019

Related U.S. Application Data

(60) Provisional application No. 62/579,441, filed on Oct. 31, 2017.

(51) Int. Cl.
*G06F 16/2453* (2019.01)

(52) U.S. Cl.
CPC .. *G06F 16/24544* (2019.01); *G06F 16/24537* (2019.01)

(58) Field of Classification Search
CPC ............ G06F 16/24537; G06F 16/24544
See application file for complete search history.

(56) References Cited

U.S. PATENT DOCUMENTS

| | | | |
|---|---|---|---|
| 2010/0082525 A1* | 4/2010 | Wilhite | G06F 16/248 707/602 |
| 2015/0356137 A1* | 12/2015 | Andros | G06F 16/2453 707/715 |
| 2018/0307709 A1* | 10/2018 | Xie | G06F 16/2246 |

OTHER PUBLICATIONS

James P. Schmeiser, David T. Barnard Producing a top-down parse order with bottom-up parsing Information Processing Letters 54 (1995) 323-326 (Year: 1995).*

* cited by examiner

*Primary Examiner* — Anhtai V Tran
*Assistant Examiner* — Xiaoqin Hu
(74) *Attorney, Agent, or Firm* — Buckley, Maschoff & Talwalkar LLC

(57) ABSTRACT

A system and method to receive a query against a plurality of data objects that are sorted, at least conceptually, to follow a hierarchical order and support a preorder traversal arrangement and a postorder traversal arrangement; translate the query into an executable query plan including at least one instance of a hierarchy rearrange operator, the hierarchy rearrange operator to rearrange an input including one or more of the plurality of data objects from one of a preorder traversal arrangement and a postorder traversal arrangement to a corresponding opposite thereof; execute the executable query plan including the at least one instance of the hierarchy rearrange operator; and generate a query result based, at least in part, on the input of the one or more plurality of data objects being rearranged in the respective preorder traversal arrangement and a postorder traversal arrangement.

17 Claims, 11 Drawing Sheets

CONSTRUCTION
$H.\text{build}(H')$
$H.\text{relink}(\ell, r, r')$

BASIC ACCESS
$v \leftarrow H.\text{node}(\ell)$
$c \leftarrow H.\text{cursor}(v)$
$\ell \leftarrow H.\text{label}(v)$
$r \leftarrow H.\text{rowid}(v)$ ORDINAL ACCESS
$i \leftarrow H.\text{pre-rank}(v)$
$c \leftarrow H.\text{pre-select}(i)$
$i \leftarrow H.\text{post-rank}(v)$
$c \leftarrow H.\text{post-select}(i)$ NODE PROPERTIES
$H.\text{depth}(v)$
$H.\text{is-root}(v)$
$H.\text{is-leaf}(v)$
$H.\text{size}(v)$
$H.\text{range-size}([v_1, v_2])$ BINARY PREDICATES
$H.\text{is-before-pre}(v_1, v_2)$
$H.\text{is-before-post}(v_1, v_2)$
$H.\text{axis}(v_1, v_2)$
$H.\text{is-parent}(v_1, v_2)$ TRAVERSAL
$c' \leftarrow H.\varsigma\text{-prev}(c), H.\varsigma\text{-next}(c)$
$c' \leftarrow H.\varsigma\text{-begin}(c), H.\varsigma\text{-end}(c)$
$c' \leftarrow H.\text{next-sibling}(c)$
$c' \leftarrow H.\text{next-following}(c)$ LEAF UPDATES
$v \leftarrow H.\text{insert-leaf}(r, p)$
$H.\text{relocate-leaf}(v, p)$
$H.\text{remove-leaf}(v)$ SUBTREE UPDATES
$H.\text{relocate-subtree}(v, p)$
$H.\text{remove-subtree}(v)$ RANGE UPDATES
$H.\text{relocate-range}([v_1, v_2], p)$
$H.\text{remove-range}([v_1, v_2])$ INNER UPDATES
$v \leftarrow H.\text{insert-inner}(r, [v_1, v_2])$
$H.\text{relocate-inner}(v, [v_1, v_2])$
$H.\text{remove-inner}(v)$

*FIG. 1*

1 operator Hierarchy Rearrange$[H; v; \text{pre} \to \text{post}](e)$
2 $S : \text{Stack}(\tau)$
3 for $t \in e$
4     while $S \neq () \wedge H.\text{is-before-post}(S.\text{top}().v, t.v)$
5         yield $S.\text{pop}()$
6     $S.\text{push}(t)$
7 while $S \neq ()$
8     yield $S.\text{pop}()$

*FIG. 3*

```
1  operator Hierarchy Rearrange [H; ν; post → pre] (e)
2  S : Vector ⟨[t : τ, cov : int]⟩
3  for t ∈ e
4      if S ≠ ⟨⟩ ∧ S.top().t.ν = t.ν
5          c ← S.top().cov
6          S.top().cov ← |S| − 1
7          S.push([t, c])
8          continue
9      cov ← |S|
10     while cov ≠ 0 ∧ ¬H.is-before-pre(S[cov − 1].t.ν, t.ν)
11         cov ← S[cov − 1].cov
12     S.push([t, cov])
13 ⟨enumerate tuples on S⟩
```

FIG. 4

```
14 ⟨enumerate tuples on S⟩:
15 Q : Stack ⟨int⟩
16 for c ← |S|; c ≠ 0; c ← S[c].cov
17     c−−
18     Q.push(c)
19 while Q ≠ ⟨⟩
20     c ← Q.pop()                                    // current subtree: c
21     cov ← S[c].cov                                 // limit for traversal
22     c' ← c
23     if c' ≠ cov
24         while c' ≠ 0 ∧ (S[c' − 1].t.ν = S[c'].t.ν)
25             c'−−
26         for j ∈ [c', c]
27             yield S[j].t
28         for c'; c' ≠ cov; c' ← S[c'].cov
29             c'−−
30             Q.push(c')
```

FIG. 5

HIERARCHY REARRANGE OPERATOR

BACKGROUND

Hierarchies are infused into our daily lives. Nearly any system in the world can be arranged in a hierarchy, be it political, socioeconomic, technical, biological, or nature itself. As a consequence, hierarchies also appear in frequently software applications throughout. Central concepts in computing are inherently hierarchical, such as file systems, access control schemes, or semi-structured document formats like XML and JSON. Looking specifically at enterprise software, hierarchies are being used for modeling geographically distributed sites, marketing schemes, financial accounting schemes, reporting lines in human resources, and task breakdowns in project plans. In manufacturing industries, so-called bills of materials that for example describe the hierarchical assembly structure of an end product, are a central artifact. In some business analytics, hierarchies in the dimensions of data cubes help data analysts to effectively organize even vast amounts of data and guide their analysis to the relevant levels of granularity.

A crucial component in virtually all of the larger mission-critical software applications is the database layer, where the hierarchies are ultimately stored. Given the important role that hierarchies play in so many commercial and organizational applications, it comes as no surprise that the first recognized database model was hierarchical in nature. Today, however, virtually all mainstream database systems are based on a relational data model.

While the relational data model is successful for a number of good reasons, its flat nature makes it particularly hard to accommodate hierarchies and their inherently recursive structure. For example, a hierarchy must be manually mapped to a flat table in the database schema, where rows of the table correspond to nodes of the hierarchy, and a designated set of columns represents the structure by means of a particular encoding scheme. Choosing and manually implementing such an encoding scheme may be a major challenge for application developers. For example, the encoding must be expressive enough to be able to answer all relevant types of queries against the hierarchy, and at the same time it must support all types of structural updates users may wish to perform. A poorly chosen encoding can render certain queries and updates prohibitively expensive to execute, if not impossible to express in the first place. The developer further has to consider the physical design and add supporting database indexes as necessary in order to find a suitable tradeoff between storage utilization, support for updates, and query performance. Additionally, care should be taken to keep the database logic maintainable, and on foreseeing future update operations and query workloads that may come up in an evolving application. All of these considerations are a major burden to developers and very hard to implement effectively and efficiently. A number of known off-the-shelf relational database products do not offer much support to their users, even though there has been popular demand ever since the relational data model has existed. A solution that application developers thus commonly resort to is to use a trivial data model for representing the hierarchy at the database layer and to outsource most logic into the application layer. This situation is especially unsatisfactory in the context of highly capable modern in-memory technology, where software architects are looking for ways to push more logic down to the database layer in order to utilize the powerful capabilities of the available hardware.

BRIEF DESCRIPTION OF THE DRAWINGS

FIG. 1 illustrates an overview of primitives for querying and updating hierarchies according to some embodiments;

FIG. 3 is an example listing of pseudo-code for a Hierarchy Rearrange process, according to some embodiments herein;

FIG. 4 is an example listing of pseudo-code for another Hierarchy Rearrange process, according to some embodiments herein;

FIG. 5 is an example listing of pseudo-code for the Hierarchy Rearrange process of FIG. 4, according to some embodiments herein;

The following description is provided to enable any person in the art to make and use the described embodiments. Various modifications, however, will remain readily apparent to those in the art.

DETAILED DESCRIPTION

In a hierarchical table model herein, a hierarchy is represented as an ordinary relational table with an added column of type NODE. Let H be a hierarchy attached to a table T. Each row r of T is associated with at most one node v of H, so there may also be rows that do not appear in the hierarchy. Conversely, each node is associated with exactly one row of T. The values in the fields of r can be regarded as labels attached to v or to the edge onto v. Besides the tree structure and a node-row association, H conceptually does not contain any data. A user never works with the hierarchy object H itself but only works with the associated table T. Consequently, a row-to-node handle is required to enable the user to refer to the nodes in H. Such a handle is provided by a column of type NODE in T.

Figure 12:
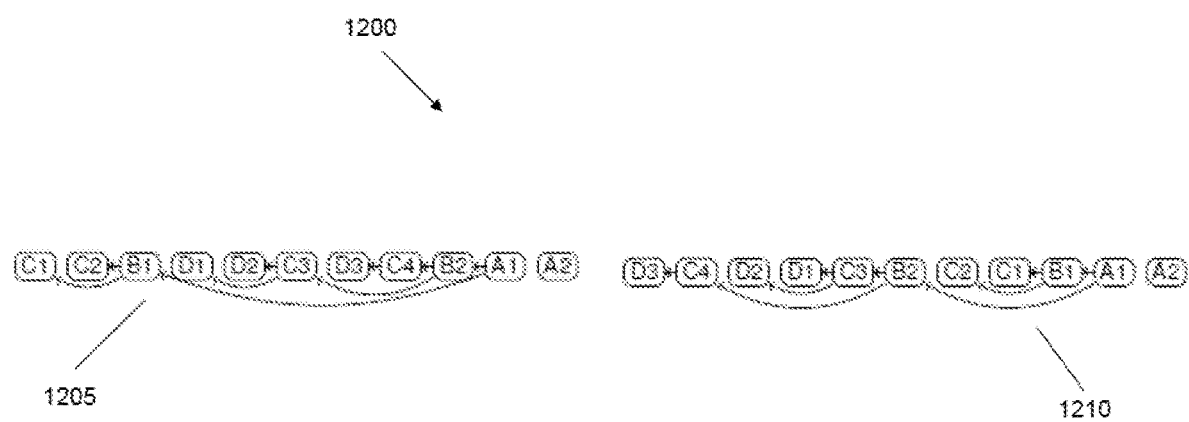

FIG. 12 illustrates an embodiment of postorder and reverse preorder sequences of a hierarchy.

A field of the predefined data type NODE represents the position of a row's associated node within the hierarchy. A table (row) may have two or more NODE fields and thus be associated with multiple distinct hierarchies. Using an explicit NODE column to serve as a handle for a hierarchical dimension allows certain embodiments to expose all hierarchy-specific functionality through that column in a natural and lightweight way.

From the user's perspective, the NODE field is opaque; it is merely a "syntactic handle" for expressing queries and updates on the hierarchy. At the backend, this fundamental design provides a mechanism to flexibly to choose between different encoding schemes for the structure, which is referred to herein as hierarchy indexing schemes. This flexibility is critical as there is no "one size fits all" encoding that could serve all applications equally well. All data structures that make up a specific type of indexing scheme are encapsulated by an abstract index interface. The interface exposes the required primitives to implement some SQL extensions herein with suitable worst-case asymptotic performance guarantees. Thus, the backend can be mostly agnostic about the layout and manipulation of the NODE-values and auxiliary data structures. Each implementation of an indexing scheme comes with a definition of the abstract NODEtype (its Label type) and a number of related data types (the Cursor and Node types, whose values serve as internal handles to single nodes), plus usually one or more auxiliary data structures.

A hierarchy indexing scheme is a specific implementation of a hierarchy encoding on top of the abstract NODE column design. The fundamental components that make up such an implementation will now be introduced.

In some aspects with most types of indexing schemes, the NODE column is backed by a somewhat sophisticated auxiliary data structure. The run-time representation of a hierarchy may therefore generally include two logical data objects: the complete contents of the NODE column, and an instance of the auxiliary data structure. Unlike the NODE column, the index structure is entirely transparent to the user: It is not an explicit, user-accessible object in the database catalog. It is created or destroyed, kept up to date, and leveraged for query processing by the backend alone without the user ever noticing. In some ways, this is comparable to a traditional index on a table column, such as a B-tree or hash table. However, there is an important difference: The hierarchy indexing scheme contains the hierarchy structure as non-redundant information. Traditional indexes, by contrast, are redundant and could be dropped at any time without losing information.

In some aspects, a hierarchy indexing scheme maintains a bidirectional association between the table rows and the internal representation of the nodes. If an auxiliary data structure is used, a Label value essentially works as a link from the row to an entry representing the node in the index structure. Defining the mechanism for this is up to the particular indexing scheme. The link from a hierarchy node to its associated row, on the other hand, is realized via ordinary row IDs. The row ID can be obtained from a Node or Cursor handle via the index interface. This "linking" via row IDs is analogous to how ordinary database indexes such as B-trees work. The row IDs are usually stored directly in the index structure entries. How a row ID is actually represented may differ significantly between row stores, column stores, disk-based systems, and in-memory systems, but this is not relevant in the present disclosure.

One motivation for having two additional data types besides Labels is that the process of locating an internal entry (i. e., obtaining a Node handle) in the auxiliary index structure given only a Label as a starting point may have a non-trivial cost. It may be preferable to avoid this non-trivial cost where possible. Furthermore, only Cursor handles have the capability to perform systematic traversals of the hierarchy structure, which may require a Cursor to comprise a non-trivial state.

The actual definitions of the Label, Node, and Cursor data types may heavily depend on the design of the auxiliary data structure. A Label may be a simple pointer, a structured set of values, or a non-trivial binary code. The Node and Cursor types may be a form of pointer to an entry in the data structure, which can be dereferenced in constant time. Any Label, Node, and Cursor values are manipulated solely through the index interface and are treated by the rest of the backend as opaque bytes. In that regard, the NODE type is comparable to BINARY or VARBINARY. That is, the Label of a row can be accessed individually and treated as opaque bytes. Whether its length is fixed or variable depends on the indexing scheme, but the size limit is known at data definition time.

In physical storage, database systems usually maintain the rows of a table in a purposeful order, such as by primary key or in a way that maximizes compression rates or temporal locality. In many scenarios, a hierarchy is not the primary dimension of a table, and clustering the associated table by hierarchy structure is infeasible or not preferable. Hierarchy indexes are therefore non-clustered indexes: The existence of a hierarchical dimension does not enforce a particular ordering of the rows in memory or persisted storage. That said, a user may still direct the system to cluster a hierarchical table by the hierarchy order, that is, to arrange the rows in pre-, post-, or level-order. This can significantly speed up certain workloads, such as when nodes are enumerated first via the hierarchy index but additional table columns are subsequently accessed. We do not consider these orthogonal optimization techniques further herein, but note that aspects of the present disclosure can easily incorporate them, as hierarchy indexes use ordinary row IDs to reference the associated rows.

FIG. 1 gives an overview of the primitives for querying and updating hierarchies that are provided by a common index interface. While many further primitives are conceivable, a design goal herein is to devise a coherent set of essential primitives that is aligned with the functionality of, for example, SQL language constructs (and foreseeable future extensions of it), but that at the same time allows for practical and efficient indexing scheme implementations. Therefore, the present disclosure omits query primitives that are clearly too specific (e. g., least common ancestor) or that few schemes can support (e. g., subtree height). In some embodiments, implementers may still decide to add special primitives for advanced applications, or redundant primitives for special cases in order to improve performance further, all of which are considered within the scope of the present disclosure.

Many operations in our interface (in particular the traversal and ordinal primitives) depend on a well-defined and deterministic sibling order. In some embodiments, we consider only indexing schemes that maintain ordered hierarchies. Even if the user hierarchy is unordered, they impose a deterministic, implementation-defined internal order.

We use a few conventions in the following discussion, including:

The variable T refers to the hierarchical table containing the NODE column at hand, which is assumed to be named "Node." The variable H refers to the associated instance of the hierarchy indexing scheme. The notation |H| refers to the number of nodes in H. The notation T[r] accesses a row of table T by its row ID r. For instance, T[r].Node retrieves the label of row r.

As used herein, l is a variable of type Label, that is, a value stored in some NODE column such as T.Node. Labels directly support basic equality comparisons $l_1 = l_2$ and $l_1 \neq l_2$. Variables v and $v_i$ are of type Node. Variables c and c' are of type Cursor. Note that a Cursor can be used in any place where a Node is required.

As used herein, the syntax [$v_1$, $v_2$] denotes a sibling range of nodes: $v_2$ must be a right sibling of $v_1$ (or $v_1$ itself), and [$v_1$, $v_2$] refers to all siblings between and including $v_1$ and $v_2$.

In some aspects, all primitives that accept arguments of type Label, Node, Cursor, require that these arguments represent valid values. For example, a node with Label l or Node handle v or Cursor c must exist in H. They are undefined otherwise. In particular, Label values are expected to be non-NULL. (NULL arguments are handled at the level of the SQL functions, which yield NULL when any argument is NULL.) These implicit preconditions are assumed and are not repeated in the following discussion.

Before proceeding to the individual primitives for queries, we first consider a discussion of how an indexing scheme is constructed and how its fundamental index/table association can be accessed and maintained is presented. Beginning with construction:

H.build(H')—Builds the hierarchy from another hierarchy representation H'.

This operation can also be used to "bulk-update" an existing indexing scheme, even if it is static. It clears the contents of H and the associated NODE column and reconstructs the index structure and NODE column to reflect the structure of H'. The given hierarchy H' must be tied to the same hierarchical table T. That is, it must contain a subset of the rows in T. The underlying representation of H' may be entirely different from H. The worst-case asymptotic runtime complexity of build( ) is required in some embodiments to be in O(|H'| log |H'|). For many indexing schemes it may even be in O(|H'|).

In some aspects, an efficient operation for bulk-building is useful in several situations. One main use case is deriving a new hierarchical table from existing relational data in another format. A related use case are bulk-updates via MERGE, which replaces the existing hierarchy structure in a hierarchical table by a newly derived structure. Another scenario is creating a snapshot from a temporal hierarchy index. Finally, serialization mechanisms can use bulk-building to efficiently reconstruct an index from a serial format.

In general, executing any of the query primitives may require access to arbitrary other index entries and labels of T, even if the primitive itself logically affects only a single node. Therefore, an important precondition for all primitives is that all node-row associations are valid at the time of invocation. However, since indexing schemes reference rows through ordinary row IDs, these associations may be affected by database operations that are not direct manipulations of the hierarchy structure, such as DML (Data Management Language) statements against the hierarchical table T or a physical reorganization. In some aspects, we therefore need the database engine to cooperate so that whenever the system "moves" a row of T that is also referenced in H (i. e., a row whose NODE value is not NULL) in a way that affects its row ID, it needs to notify the indexing scheme to update its node-row association. The following primitive, H.relink(l, r, r')

serves this purpose and updates the row associated with the node given by label l. This tells the index that the row with former ID r now has a new row ID r'.

Regarding basic access, a few elementary primitives are needed in order to obtain an index handle from a given table row, and vice versa, including:

v←H.node(l)—The node with label l.
c←H.cursor(v)—A cursor to node v.
l←H.label(v)—The label of node v.
r←H.rowid(v)—The row ID corresponding to the given node v.

In some aspects, most query and update primitives require at least Node objects or even cursors as arguments. A label l as such is therefore not very useful. The corresponding node has to be located first in the index structure using node(l). Vice versa, given a Node handle, label( ) returns the corresponding Label object, that is, node( ) and label( ) are inverse:

H.label(H.node(l))=l

The rowid( ) function returns the ID of the corresponding table row holding the label, which allows access to the whole table row rather than just the label. Thus, label(v) is logically just a short-hand for T[H.rowid(v)].Node.

Node Properties compute characteristic properties of a node. One node property of interest herein is:

H.is-root(v)

that computes whether v is a root node, i. e., a child of T.

Binary Predicates allow us to test the relationship of two given nodes.

For example, $v_1$=$v_2$—determines whether $v_1$ and $v_2$ are the same node.
H.is-before-pre($v_1$,$v_2$)—computes whether $v_1$ precedes $v_2$ in a preorder traversal.
H.is-before-post ($v_1$,$v_2$)—computes whether $v_1$ precedes $v_2$ in a postorder traversal.
H.axis($v_1$, $v_2$)—returns the axis of $v_1$ with respect to $v_2$.

There are exactly five basic, disjunct axes in which two given nodes can possibly be positioned, as illustrated by the following:

Axes={preceding, ancestor, self, descendant, following}.

The Node equality check "=" has the usual properties of an equivalence relation. The is-before-pre( ) and is-before-post( ) predicates form a total and strict order relation on the set of Node objects—that is, they are irreflexive, asymmetric, and transitive. In particular, exactly one of the following terms is always true (where $\zeta$ is either "pre" or "post"):

H.is-before-$\zeta$($v_1$, $v_2$)$\vee$($v_1$=$v_2$)$\vee$H.is-before-$\zeta$($v_2$, $v_1$).

Of key significance herein, most of the order-based physical hierarchy operators we discuss herein rely on "=" and is-before-$\zeta$( ) alone, which makes them the most important primitives for query processing.

A self axis check "H.axis($v_1$, $v_2$)=self" is equivalent to "$v_1$=$v_2$." Also, the other axes can be dissected into elementary is-before-$\zeta$( ) checks, as follows:

H.axis($v_1$, $v_2$)=preceding$\Leftrightarrow$H.is-before-pre($v_1$, $v_2$)$\wedge$H.is-before-post($v_1$, $v_2$)
H.axis($v_1$, $v_2$)=ancestor$\Leftrightarrow$H.is-before-pre($v_1$, $v_2$)$\wedge$H.is-before-post($v_2$, $v_1$)
H.axis($v_1$, $v_2$)=descendant$\Leftrightarrow$H.is-before-pre($v_2$, $v_1$)$\wedge$H.is-before-post($v_1$, $v_2$)
H.axis($v_1$, $v_2$)=following$\Leftrightarrow$H.is-before-pre($v_2$, $v_1$)$\wedge$H.is-before-post($v_2$, $v_1$)

It follows from these definitions that the preceding, ancestor, descendant and following axis checks are also strict order relations, albeit not total.

In some embodiments, the present disclosure relates to a process of translating query language extensions into executable query plans. In some regards, most of the SQL extensions herein take the form of functions operating on the abstract NODE data type and as such do not actually extend the syntax and semantics of SQL. Thus, some functions herein might rely on existing relational algebra operators in their translation. In some embodiments, a key to efficient query evaluation is a set of special-purpose hierarchy operators. Unlike many existing (i.e., prior) works, processes and algorithms disclosed herein are not tied to specific types of labeling schemes. They rely entirely on the abstract Label, Node, and Cursor concepts and the query primitives of the interface. This way, a lot of complexity is hidden, and query processing can use the same algorithms irrespective of the underlying indexing scheme.

Figure 2:
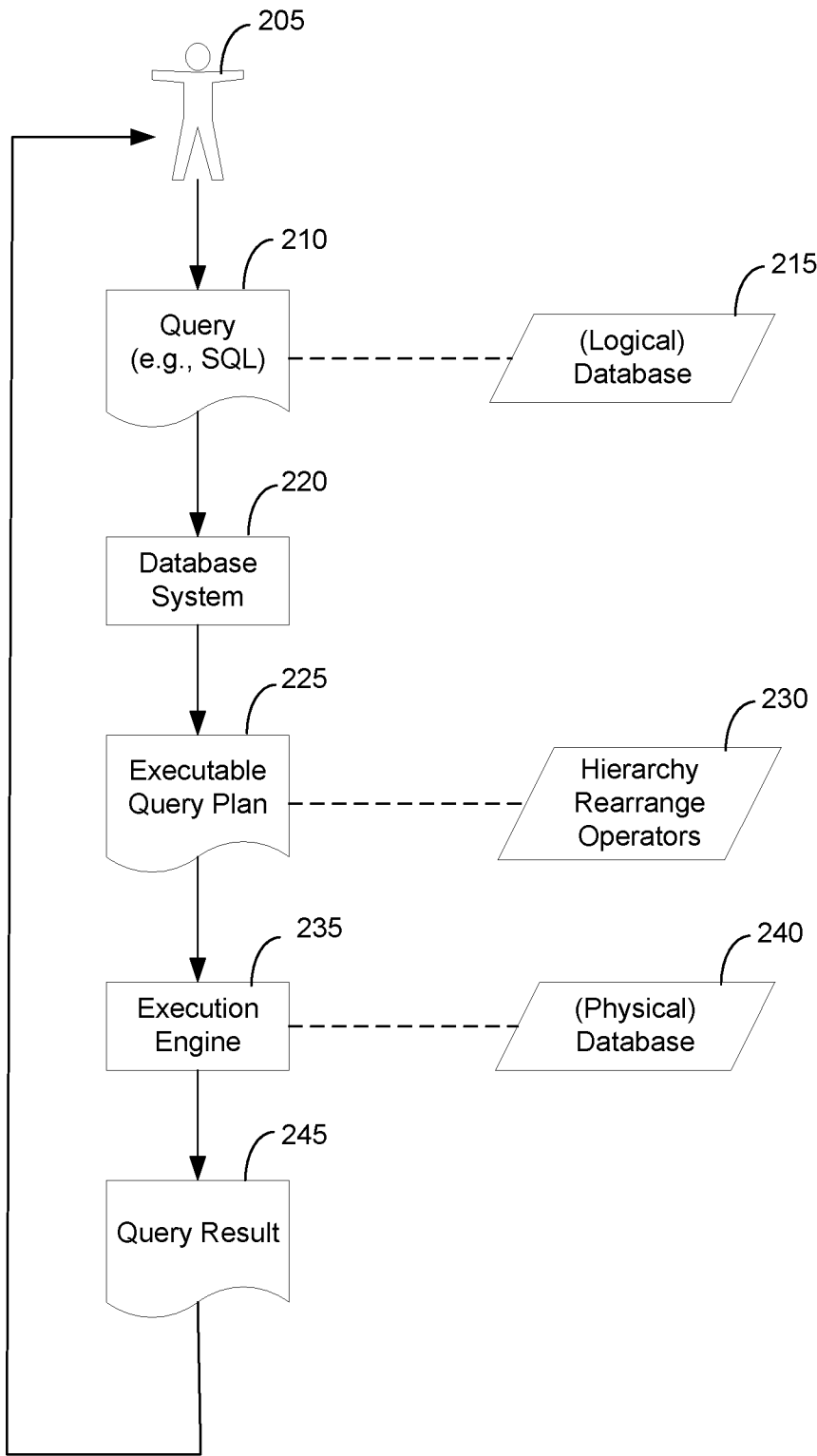
FIG. 2 is an illustrative high-level flow diagram of a process for querying and updating hierarchical data according to some embodiments.

FIG. 2 is a flow diagram of an illustrative process 200, in accordance with some aspects and embodiments herein. Process 200 is exemplary of a high-level system view that may include some aspects of the algorithms, processes, and functions of the present disclosure. A user 205 may invoke or otherwise initiate process 200 by submitting or causing the submission of query 210 that will be executed against a database 215. In some instances, the query may be submitted to an application, service, system, and/or an interface of an application, service, or system that operates on or processes data in (logical) database 215 containing hierarchical data or a hierarchal table. The data in database 215 may be, at least conceptually, organized in a hierarchical manner. Query 210 may be formatted in a declarative programming language such as SQL that is understood by the application, service, or system.

Query 210 is further transmitted/sent to a database system at operation 220. The database system may operate to translate query 210 into an executable query plan 225 that includes one or more statements to effectuate an execution of the query. In accordance with some aspects of the present disclosure, the query execution plan may include one or more Hierarchy Rearrange (HR) operators 230 (disclosed in detail below). At operation 235, an execution engine associated with database system 220 and operating in cooperation with a (physical) database 240 executes query plan 525 to generate query result 245. In some aspects, query result 245 may be sent/transmitted to user 205. In some aspects, a query result of process 200 may be stored in a main memory (e.g., of database system 220), on disk, in processor cache, in combinations thereof, and in/on other storage facilities.

In the following description, two algorithms are described and referred to herein as Hierarchy Rearrange (HR) operators or functions. The first algorithm rearranges an input stream sorted in preorder to postorder. The second algorithm rearranges a postorder input stream to preorder.

As used herein, an input stream refers to a non-static flow of input objects. The disclosed HR functions herein may operate on an input stream of objects and produce an output, prior to a receipt of a complete set of input objects.

In some embodiments, the following Syntax [H; v; $\zeta \rightarrow \zeta'$] (e) is used, where H is a hierarchy index, v is a node attribute name, and $\zeta \rightarrow \zeta'$ is either "pre→post" or "post→pre." The input must have a Node field v. Formally, $e:\{\tau\}_b$ for some tuple type $\tau$ with a field v:Node$^H$. The input is required to be sorted by v in $\zeta$-order. In some embodiments, no additional pre-requisites are required regarding the inputs herein.

Given the input as defined here, The output is of type $\{\tau\}_b$ and sorted by v in $\zeta'$-order.

From a functionality perspective, sorting a table of nodes in preorder or postorder arrangement, can be accomplished using an ordinary Sort operator with is-before-$\zeta$( ) as comparison predicates as follows:

Sort [<] (e), where $t_1 < t_2 :\Leftrightarrow$ H.is-before-pre($t_1$.v, $t_2$.v).

However, if the input is already sorted in either postorder or preorder, the Hierarchy Rearrange (HR) operators disclosed herein can exploit that order to perform the same sorting tasks more efficiently.

In some aspects, a main use case of the HR operators disclosed herein may be used as a "glue" operator to establish an order required by subsequent operator in the query execution plan which expect rows to be in either preorder-based or postorder-based. Examples for such operators are hierarchical merge join (HMJ), hierarchical merge groupjoin (HMGJ), and hierarchical grouping (HG), which perform commonly required subtasks in answering queries against hierarchical data.

FIG. 12 illustrates an embodiment 1200 of a postorder sequence 1205 and of a reverse preorder sequence 1210 of a hierarchy. To better understand how the HR processes disclosed herein work in principle, note that the postorder sequence 1205 of the nodes in a hierarchy is somewhat comparable to the reverse preorder sequence 1210 in that a node appears before any of its ancestors. The difference is that in postorder the children of each node (and with them their subtrees) are arranged in their original order, whereas in reverse preorder they are reversed. Compare, for instance, the postorder sequence 1205 (left) and reverse preorder sequence 1210 (right) of our familiar example hierarchy as shown in embodiment 1200 of FIG. 12.

To convert a general input e from preorder to postorder, we therefore have to delay yielding a tuple t until all its descendants have been processed. This reverses the "vertical" order of the input. At the same time, care should be taken to make sure that all immediate descendants of the tuple t remain in their original order. This way we keep the "horizontal" order intact. The algorithms we discuss below achieve this by stashing their input tuples on a stack and carefully unwinding this stack at the point when the respective descendants (in the pre→post case) or ancestors (in the post→pre case) have been processed.

The following discussion relates to a process and algorithm for the Hierarchy Rearrange "pre→post" operator. The HR [pre→post] process can be defined by the pseudo-code of FIG. 3:

The algorithm or function shown in FIG. 3 unconditionally stashes each input tuple t on the stack S. But first, the inner loop (lines 4-5) pops and yields any tuples whose node v is on the preceding axis with respect to t.v. The effect of performing this loop at each iteration is that runs of tuples in preceding-following relationships (such as a run of siblings) will be yielded in their originally encountered order, whereas runs of tuples in ancestor-descendant relationships remain on the stack until all their descendants have been processed, and are then popped in reverse order. In other words, the "horizontal" order is maintained but the "vertical" order is reversed, which results in the desired postorder.

However, the pseudo code as shown in FIG. 3 also reverses the relative order of runs of tuples with equal v values (i. e., in self relationships). If this is not desired, the inner loop needs to be refined so as to first identify those runs and yield them in their original order.

The runtime complexity of the HR operator of FIG. 3 is in $O(|e|)$ (i.e., linear). An attractive property is that e is pipelined at least partially. The worst-case space complexity is in $O(|e|)$ as well. This worst case happens, for example, when all v values are equal. However, if we assume that all nodes are distinct, then the stack size |S| is bounded by the height of the hierarchy H, since S then forms a run of tuples in ancestor-descendant relationships at any point.

The process and algorithm for the Hierarchy Rearrange operator "post→pre" is comparatively involved relative to the "pre→post" process (i.e., FIG. 3). Due to the nature of postorder, pipelining is very limited. For instance, the root node of a hierarchy appears last in postorder but first in preorder. Since the algorithm cannot know whether it has already seen the "highest" ancestor in a run of tuples (i.e., stream), it must buffer and analyze its whole input first before it can yield the first output tuple. FIG. 4 is an illustrative listing of pseudo-code for the Hierarchy Rearrange "post→pre" operator herein.

The algorithm or function of FIG. 4 stashes each input tuple on the vector S, which is built up like a stack but also accessed in a random manner. For each tuple t, it identifies the range of previously seen tuples that are "covered" by t, that is, on the self or descendant axes with respect to t.v. The covered ranges are represented by the "coy" fields on the vector: coy is the index of the first (lowest) covered entry on S. That is, for each i, entry S[i] covers entries S[S[i].cov, i[. In other words, the tuples S[cov, i[ are on the self or descendant axes, whereas the tuples S[0, cov[ are on the preceding axis with respect to S[i].v. The block lines 9-11 in FIG. 4 determines coy for t by hopping over S backwards (skipping any transitively covered entries). If, however, t.v equals the previously processed node, special care has to be taken (FIG. 4, lines 4-8). The entry for t then steals the coy value from the previous tuple u, whose coy value is adjusted to "empty range." This helps us identify runs of tuples with equal v values later on: In each such run $S[i_1, i_2]$, the uppermost tuple $S[i_2]$ covers the other tuples $S[i_1, i_2[$ in addition to the descendants, whereas each tuple in $S[i_1, i_2[$ covers only itself.

With the collected coverage information, the (enumerate tuples on S) block can finally enumerate the output in the desired order. It effectively performs a preorder traversal of the constructed vector, as seen in FIG. 4.

The stack Q stores the indexes of remaining S entries to visit. The first loop (i.e., FIG. 5, lines 16-18) initializes Q with the "top-level" tuples that are not covered by any other tuple. The main loop (FIG. 5, lines 19) repeatedly picks the top-most tuple c on Q to visit. The tuples belonging to the subtree of S[c].v can be found in the range S[S[c].cov, c]. The loop at lines 22-25 of FIG. 5 first identifies the range [c', c] of equal nodes. S[c] and its equal nodes are then yielded in the original order (i.e., FIG. 5 at lines 26-27). The loop at lines 28-30 then enumerates c's directly covered entries backwards and pushes them onto Q (similar to lines 16-18, FIG. 5). This has the effect that these entries will be visited subsequently in their correct (original) order.

In an actual implementation of this algorithm, it may be beneficial to not actually copy the input tuples onto S. Instead, the input can be materialized, so that S only needs to store the node v and a pointer to the actual tuple. In some aspects, this approach improves cache efficiency if the tuples are large.

In some embodiments and as another optimization, the stack can be flushed early whenever the previous node was a root. To this end, an is-root( ) check may be inserted in the code listing of FIG. 4 after line 8, such as the following:

```
if S ≠ ( ) ∧ H.is-root(S.top( ).t.v)
|        (enumerate tuples on S)
|        S ← ( )
```

Figure 6:
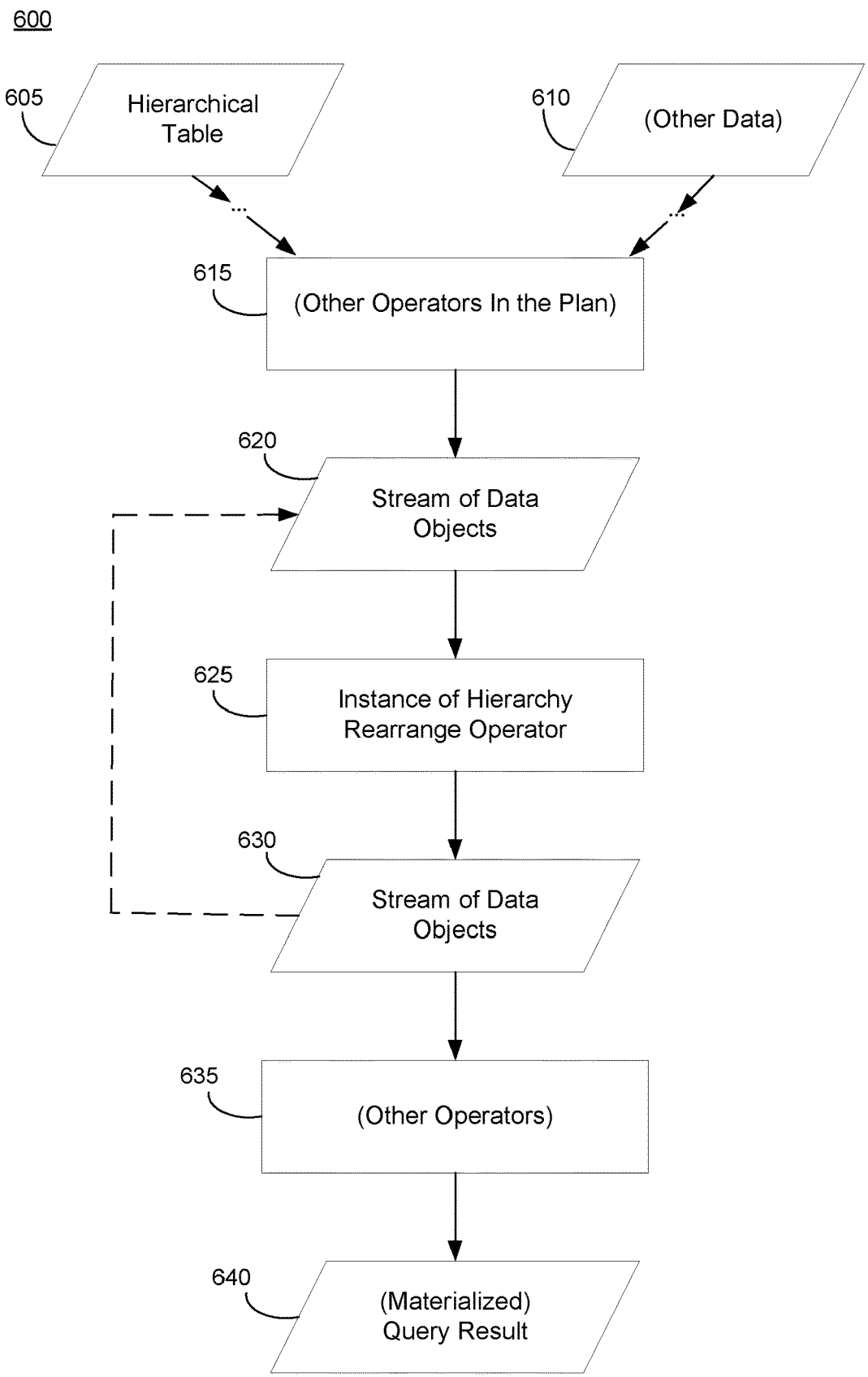
FIG. 6 is an illustrative flow diagram of a process for an executable query plan according to some embodiments.

FIG. 6 is an illustrative flow diagram of a process 600 including an executable query plan. In some aspects, process 600 shown in FIG. 6 may correspond to the executable query plan 225 in FIG. 2. As seen in FIG. 6, hierarchical data such as, for example, hierarchical table data 605 stored in a (physical) database, and as well as other data 610 (stored and/or sourced from a database and other data stores or sources) may be received and read by one or more operators in an executable query plan at operation 615. The operators at operation 615 refer to query operators (e.g., SQL statements) other than the HR operators disclosed herein and may produce a stream of data objects at 620. In some aspects, the stream of data objects 620 may be produced to fulfill the requirements (i.e., prerequisites) of the HR operators disclosed herein. Namely, data objects 620 may be configured into a sorted arrangement so that is-before-pre/post comparisons can be applied.

Proceeding to operation 625, an instance of the HR operators disclosed herein operate to consume the stream of data objects 620. The particular instance of the HR operator invoked at operation 625 is specified by the executable query plan. A stream of data objects comprising an output of the HR operator invoked at 625 is shown at 630. The stream of data objects 630 includes the same data as the input stream of data objects 620, but the data 630 is rearranged pre↔post, as dictated by the specific instance of HR operator at operation 625.

In some embodiments, process 600 may proceed from 630 back to 620 to invoke additional instances of the HR operators herein, as required by the executable query plan. In the event no additional instances of the HR operators disclosed herein are called to be applied to the input stream of data objects 620, process 600 progresses to operation 635 where one or more query operators other than the HR operators disclosed herein may be applied to the stream of data objects 630 in further fulfillment of the executable query. A query result 635 may be produced based on the execution of the instances of the HR operators 625 and other query plan operators 615 and 635.

Figure 7:
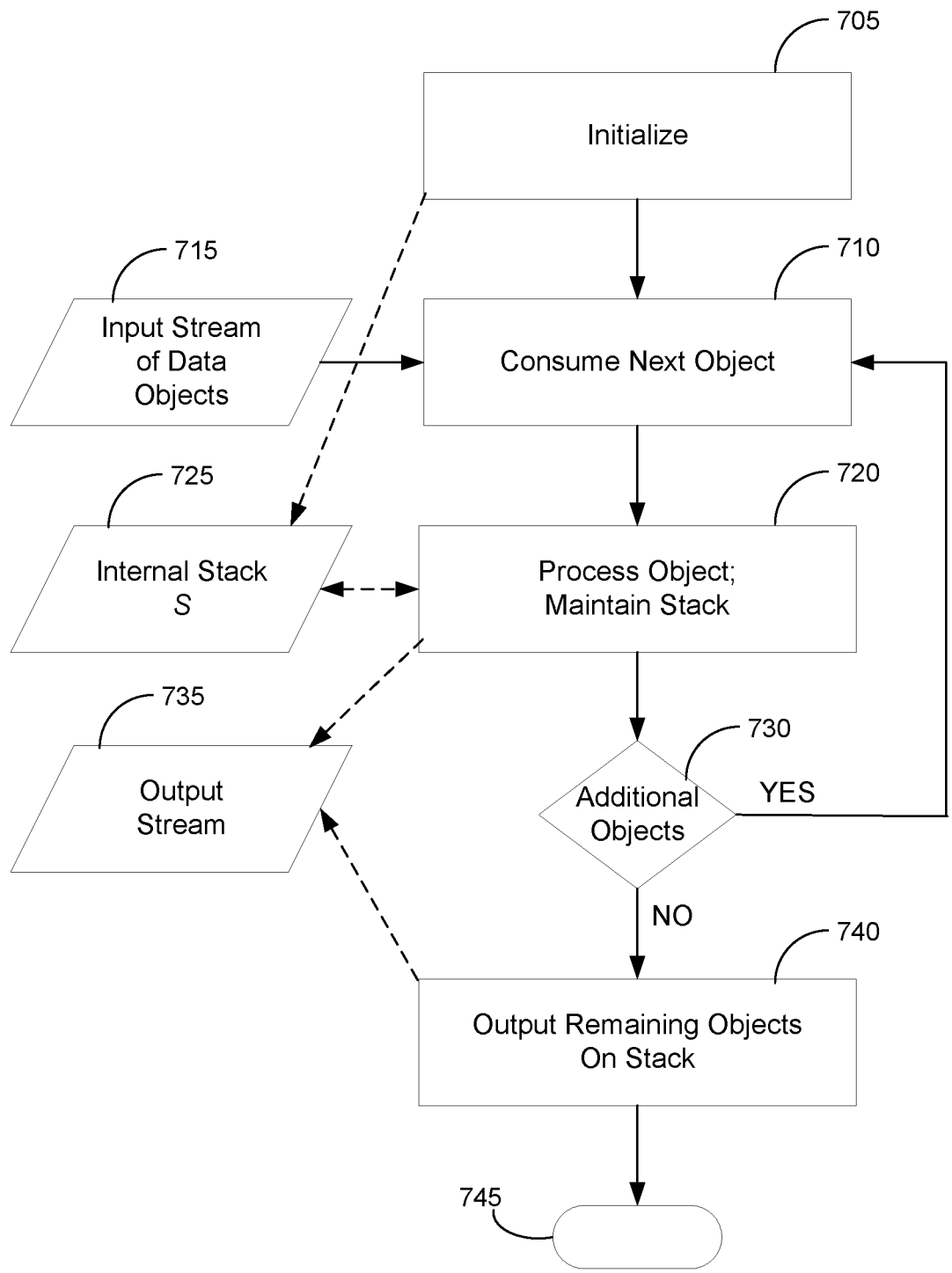
FIG. 7 is an illustrative flow diagram of a Hierarchy Rearrange process (pre→post) according to some embodiments.

FIG. 7 is an illustrative flow diagram of a Hierarchy Rearrange process (pre→post), according to some embodiments herein. In some aspects, process 700 shown in FIG. 7 may correspond to an instance of the HR operator 625 in FIG. 6. Process 700 is initialized at operation 705 and further creates internal stack S 725 (i.e., lines 1-2 of FIG. 3). At operation 710, a next object of an input stream of data objects 715 is consumed (i.e., line 3 of FIG. 3). At operation 720, the data object consumed at operation 710 is processed and maintained in internal stack S (i.e., FIG. 3, lines 4-9).

Operation 720 may yield "ready" objects to output stream 730 and process 700 may otherwise progress to 730 where a determination is made whether there are additional objects in the input data stream for further processing. In the event there are additional objects in the input stream, process advances from decision point 730 to operation 710 to consume the next object in the input stream 715. In the event there are no additional objects in the input stream, process 700 proceeds from decision point 730 to operation 740 to output the remaining data objects on the stack 735 (FIG. 3, lines 10-12). Process 700 may terminate at 745.

Figure 8:
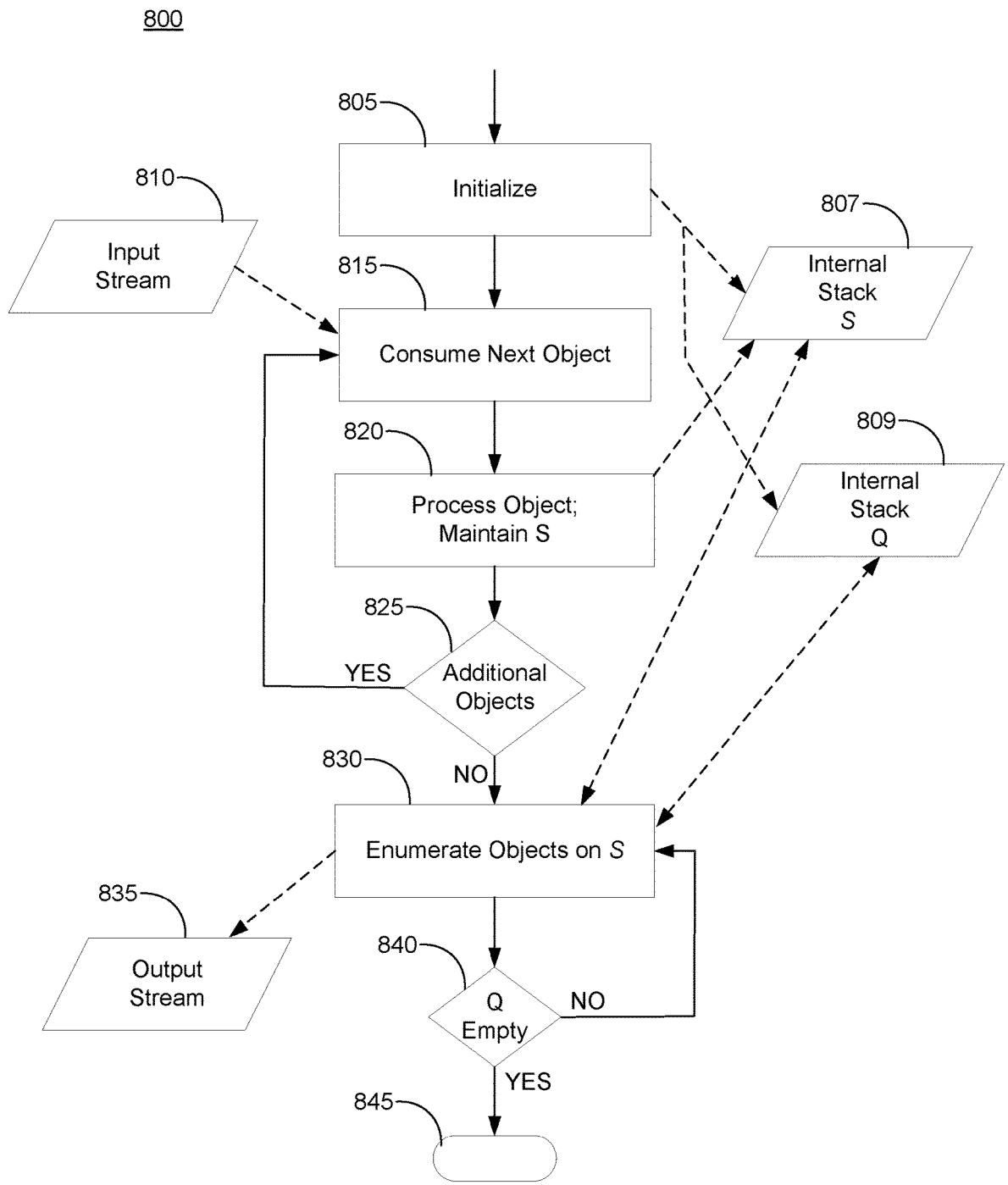
FIG. 8 is an illustrative flow diagram of a Hierarchy Rearrange process (post→pre) according to some embodiments.

FIG. 8 is an illustrative flow diagram of a Hierarchy Rearrange process (post→pre) according to some embodiments. In some aspects, process 800 shown in FIG. 8 may correspond to an instance of the HR operator 625 in FIG. 6. Process 800 is initialized at operation 805 (i.e., FIG. 4, lines 1-2) where an internal stack S 807 and internal stack Q are created. At operation 815, a next object in the input data stream 810 is consumed. At operation 820, the data object consumed at operation 815 is processed and maintained in internal stack S (i.e., FIG. 4, lines 4-12).

In the event there are additional objects in the input stream, process 800 advances from decision point 825 to operation 815 to consume the next object in the input stream 810. In the event there are no additional objects in the input stream, process 800 proceeds from decision point 825 to operation 830 to consume the objects in the internal stack S and enumerate on objects on S and maintain them on Q. Operation 830 may yield "ready" objects to output stream 835 and process 800 may otherwise progress to 840 where a determination is made whether internal stack Q is empty. If stack Q is not empty, then process 800 returns to operation 830, otherwise process 800 terminates at 845.

In some aspects, the HR processes and algorithms herein have been demonstrated to improve technical efficiencies in sorting hierarchical data. Aspects of the utility of the HR processes disclosed herein have been illustrated in the use-case of a query execution plan that might invoke one or more of the disclosed HR process one or more times in execution of a query plan to satisfy a query.

The following discussion includes a disclosure of some experimental evaluation(s) realized by Applicants.

Applicants have compared plans based on Sort to plans based on Hierarchy Rearrange (HR) disclosed herein. Recall that the HR operator consumes an input that is already sorted in either preorder or postorder and employs a stack-based algorithm to convert it to the respective other order. Its advantage over Sort is that it allows for pipelining to some degree. Here we investigate the potential of these "order-based" sorting algorithms.

Experimental data evaluated includes queries Q1 and Q2 that work directly on the hierarchical base table and access only the Node field. They simply select all nodes and sort them in either postorder (Q1) or preorder (Q2), specified by, for example:

SELECT Node, ROWID FROM HT ORDER BY [POST_RANK(Node)|PRE_RANK(Node)]

For each query, four different methods or processes were compared for doing the sorting. In some instances, some preprocessing work on HT that is not included in the time measurements was completed. For example, a Map operator (i.e., a conventional Map operator (function application)) was used to convert the Node column of HT to a column v of corresponding Node objects. We project only the row ID and v fields and materialize the result in a table Inp. For some of the plans we need a preorder-sorted copy Inp-pre of Inp and a postorder-sorted copy Inp-post, which we also prepare and materialize ahead. In the bottom-up case Q1, the four plans include:

1. A simple $e_1 \leftarrow$ Scan(Inp-post). As used here, the "Scan" operator refers to a simple table scan over the hierarchical table HT, using the conventional scan operator that is implemented in the database system.
2. Using Hierarchy Rearrange on the preorder-sorted copy of Inp: $e_1 \leftarrow$ Hierarchy Rearrange [H; v; pre→post] (Inp-pre)
3. Performing a full sort of Inp: As used here, the "Sort" operator refers to using the conventional sorting operator that is implemented in the database system.
$e_1 \leftarrow$ Sort [<] (Inp) where $t_1 < t_2 := H.is\text{-}before\text{-}post(t_1.v, t_2.v)$
4. Enumerating the HT tuples in the desired order using a Hierarchy Index Scan. Hierarchy Index Scan performs a scan over the nodes in the hierarchy index H in the desired order (here: post) and for each such node accesses the corresponding tuple of HT, in that order. $e_1 \leftarrow$ Hierarchy Index Scan [H; v; post] (HT)

In the top-down case Q2, the plans are identical, except that the preorder and postorder roles have to be swapped. Note that Plan 4 works only for these particular queries, as we are working directly on HT instead of an arbitrary input table.

Beyond Q1 and Q2, which allow us to assess the peak performance of the different sort methods, it is also interesting to note how these operators interact with other operators in a more "useful" (e.g., practical) query. To this end, queries Q3 and Q4 perform a hierarchical computation based on a bottom-up and a top-down window, respectively.

SELECT Node, SUM(Value) OVER w
FROM Inp WINDOW w AS (HIERARCHIZE BY Node [BOTTOM DOWN|TOP DOWN])

These queries give us an indication of the additional costs when the input is not already in the required order. The Value field is generated upfront. The plans we compare are the same as for Q1 and Q2, except that an additional Hierarchical Grouping (HG) operator is applied to the sorted output $e_1$, and in case of Plan 4 an additional Map operator is needed to bring in the Value field. The HG operator is identical in all plans for Q3: Please note that this HG operator consumes the input stream, assuming it is sorted in postorder, then groups the tuples by v, computes the sums of Value over all descendants for each node.

Hierarchical Grouping [H; v; post; {descendant}; x: sum (Value)]($e_1$)

In the top-down case Q4, the descendant axis becomes the ancestor axis, accordingly.

Figure 9:
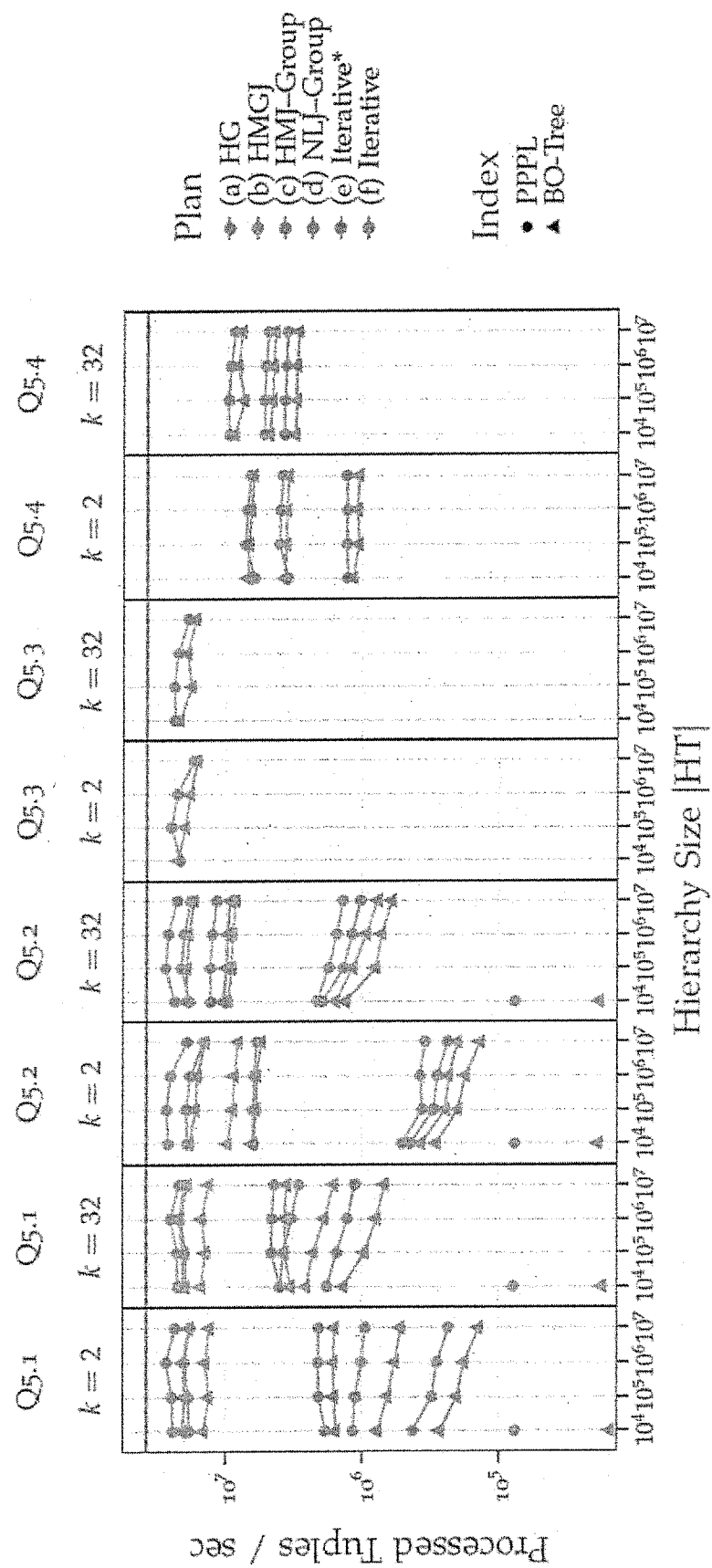
FIG. 9 is a graph including experimental results comparing different sorting plans, including plans using the HR processes according to some embodiments.

From the results shown in FIG. 9, applicants first see that dynamic indexes suffer from their more expensive is-before( ) calls, which are heavily exercised for sorting. Unsurprisingly, this affects full sorting (Plan 3) in particular. Apart from that, applicants observe that full sorting is less expensive than one may expect—roughly 3 times slower than Plan 1 with PPPL(pre-post-parent level)—considering that our algorithm is not multithreaded. Leveraging an index scan (Plan 4) also helps a lot, but is of course possible only when working directly on the hierarchical table. Most interestingly, the "order-based sorting" of Hierarchy Rearrange (Plan 2) is greatly superior to a full Sort, especially in the bottom-up PPPL case: HR closely approaches the "perfect" speed of Plan 1, where no sorting is performed at all. This noted efficiency may be explained by the favorable data locality in the already preorder-sorted inputs.

When comparing the numbers for the HR- and HIS (hierarchy index scan)-based plans to Plan 1, applicants notice only a moderate slowdown. The push-based query execution model allows our HR and HIS operators to efficiently pipeline their results into the subsequent Hierarchical Grouping operator, which effectively hides parts of its costs. As a full pipeline breaker, Sort (i.e., Plan 3) is again at a disadvantage in that regard.

On a higher level, these results also mean that our hierarchy operators that consume postorder inputs are not actually restricted to only postorder. By adding Hierarchy Rearrange operators, they can be applied to preorder inputs as well at only moderate extra costs. This also applies to the preorder-based (top-down) algorithms, although HR is somewhat less effective in these cases due to the more complicated logic and additional buffering that is necessary for post-to-pre conversion.

Figure 10:
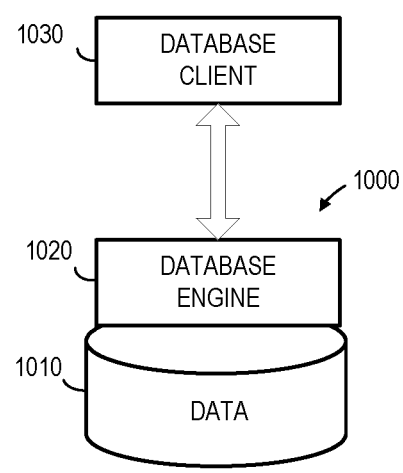
FIG. 10 is an illustrative block diagram of a database system, according to some embodiments.

FIG. 10 is a block diagram of database 1000 according to some embodiments. FIG. 9 represents a logical architecture for describing systems according to some embodiments, and actual implementations may include more or different components arranged in other manners.

Database 1000 may comprise any query-responsive data source or sources that are or become known, including but not limited to a structured-query language (SQL) relational database management system. Database 1000 may comprise a relational database, a multi-dimensional database, an eXtendable Markup Language (XML) document, or any other data storage system storing structured and/or unstructured data. The data of database 1000 may be distributed among several relational databases, multi-dimensional databases, and/or other data sources. Embodiments are not limited to any number or types of data sources. For example, database 1000 may comprise one or more OnLine Analytical Processing (OLAP) databases (i.e., cubes), spreadsheets, text documents, presentations, etc.

Database 1000 may implement an "in-memory" database, in which volatile (e.g., non-disk-based) storage (e.g., Random Access Memory) is used both for cache memory and for storing the full database during operation, and persistent storage (e.g., one or more fixed disks) is used for offline persistency and maintenance of database snapshots. Alternatively, volatile storage may be used as cache memory for storing recently-used data, while persistent storage stores the full database. In some embodiments, the data of database 1000 comprises one or more of conventional tabular data, row-based data stored in row format, column-based data stored in columnar format, and object-based data. Database 1000 may also or alternatively support multi-tenancy by providing multiple logical database systems which are programmatically isolated from one another. Moreover, the data of database 1000 may be indexed and/or selectively replicated in an index to allow fast searching and retrieval thereof.

Database 1000 may store metadata describing regarding the structure, relationships and meaning of the data stored within database 1000. This information may include data defining the schema of database tables stored within database 1000. A database table schema may specify the name of the database table, columns of the database table, the data type associated with each column, and other information associated with the database table.

Database 1000 includes, among other data, hierarchical data 1015. Hierarchical data 1015 may include any type of hierarchical data that is or becomes known, not limited to the HR data mentioned above. The structure of the hierarchies among hierarchical data 1015 may change from time to time. Some of hierarchical data 1015 may be versioned, in that one or more past versions of a hierarchy are persisted in database 1000.

Database engine 1005 performs administrative and management functions for database 1000. Such functions may include snapshot and backup management, indexing, optimization, garbage collection, and/or any other database functions that are or become known.

Figure 11:
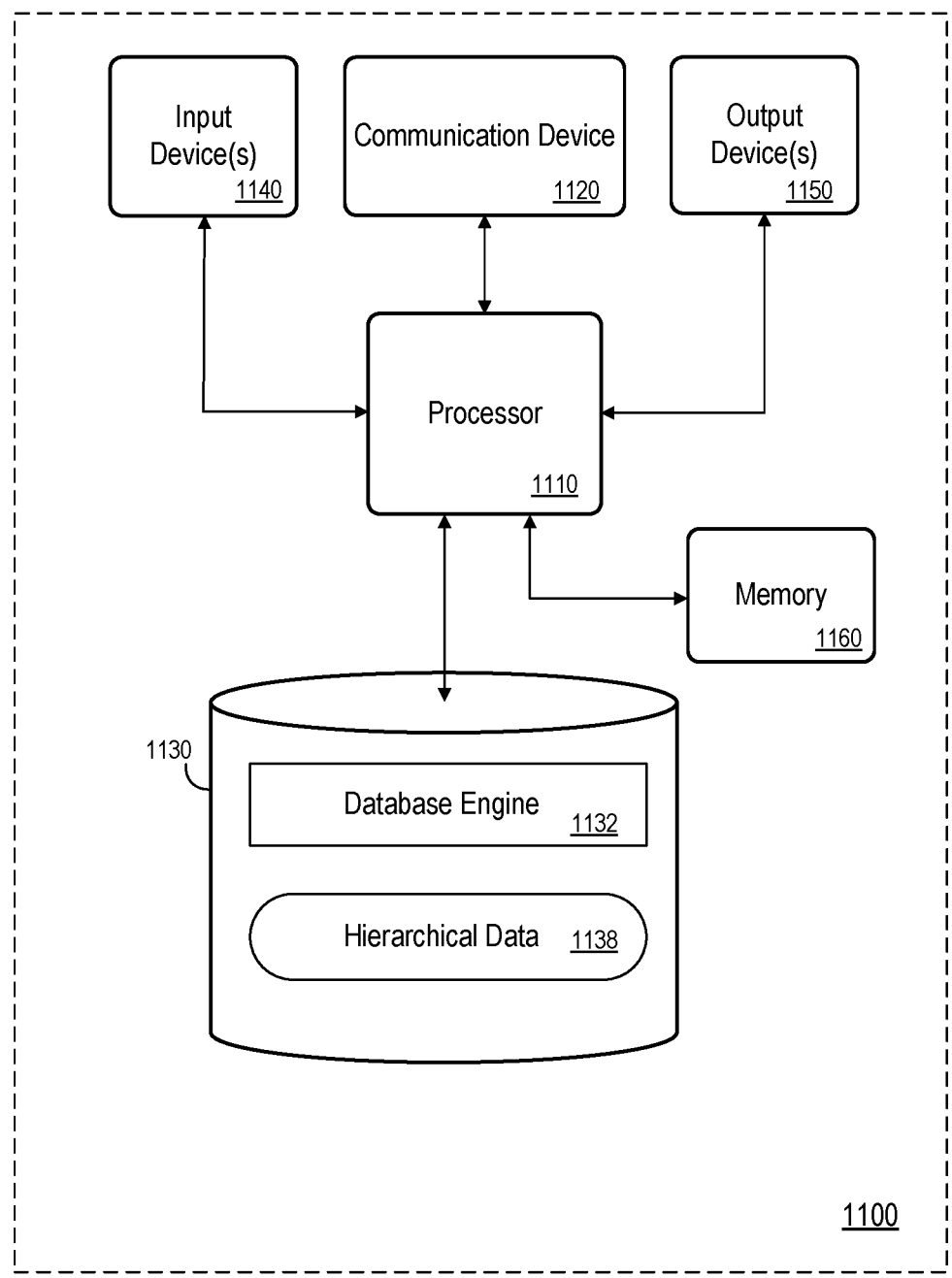
FIG. 11 is a block diagram of a computing system according to some embodiments.

FIG. 11 is a block diagram of system 1100 according to some embodiments. System 1100 may comprise a general-purpose computing system and may execute program code to perform any of the processes described herein. System 100 may comprise an implementation of database 1000 according to some embodiments. System 100 may include other unshown elements according to some embodiments.

System 1100 includes processor 1110 operatively coupled to communication device 1120, data storage device 1130, one or more input devices 1140, one or more output devices 1150 and memory 1160. Communication device 1120 may facilitate communication with external devices, such as a reporting client, or a data storage device. Input device(s) 1140 may comprise, for example, a keyboard, a keypad, a mouse or other pointing device, a microphone, knob or a switch, an infra-red (IR) port, a docking station, and/or a touch screen. Input device(s) 1140 may be used, for example, to enter information into apparatus 1100. Output device(s) 1150 may comprise, for example, a display (e.g., a display screen) a speaker, and/or a printer.

Data storage device 1130 may comprise any appropriate persistent storage device, including combinations of magnetic storage devices (e.g., magnetic tape, hard disk drives and flash memory), optical storage devices, Read Only Memory (ROM) devices, etc., while memory 1160 may comprise Random Access Memory (RAM).

Database engine 1132 may comprise program code executed by processor 1110 to cause apparatus 1100 to perform any one or more of the processes described herein. For example, database engine 1132 may execute a query plan as discussed in accordance with processes 200 and 600, including the execution of Hierarchy Rearrange operators as disclosed in, for example, processes 700 and 800, FIGS. 7 and 8 respectively. Embodiments are not limited to execution of these processes by a single apparatus. Hierarchical data 1138 may be implemented as described above. As also described above, database 300 may be implemented using volatile memory such as memory 1160. Data storage device 1130 may also store data and other program code for providing additional functionality and/or which are necessary for operation of system 1100, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 1000 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state Random Access Memory (RAM) or Read Only Memory (ROM) storage units. Embodiments are therefore not limited to any specific combination of hardware and software.

Any of the methods described above may be implemented by processing units executing processor-executable program code stored in a memory. Processing units as described herein may be processors, processor cores, multi-core processors, etc.

Actual implementations may include software elements, hardware elements, or any combination thereof. For example, a system may be implemented using any number of computing devices, and one or more processors within the system may execute program code to cause corresponding computing devices to perform processes described herein.

Generally, each logical element described herein may be implemented by any number of devices coupled via any number of public and/or private networks. Two or more of such devices may be located remote from one another and may communicate with one another via any known manner of network(s) and/or via a dedicated connection.

Embodiments described herein are solely for the purpose of illustration. Those in the art will recognize other embodiments may be practiced with modifications and alterations to that described above.

What is claimed is:

1. A computing system comprising:
a storage device storing a plurality of data objects, wherein the plurality of data objects are stored in at least one table, the table comprising a plurality of rows and at least one column, each of the plurality of rows being associated with a node of a hierarchy indexing scheme, and one of the at least one column representing a position of a row's associated node within the hierarchy indexing scheme, and the plurality of data objects are sorted, at least conceptually, to follow a hierarchical order of the hierarchy indexing scheme and support a preorder traversal arrangement and a postorder traversal arrangement;
a memory storing processor-executable program code;
a processor to execute the processor-executable program code in order to cause the computing system to:
receive a query against the plurality of data objects;
translate the query into an executable query plan, the executable query plan including at least a first hierarchy rearrange operator and a second hierarchy rearrange operator, the first hierarchy rearrange operator to rearrange an input including one or more of the plurality of data objects from a preorder traversal arrangement to a postorder traversal arrangement, and the second hierarchy rearrange operator to rearrange the one or more of the plurality of data objects from a postorder traversal arrangement to a preorder traversal arrangement;
execute the executable query plan, including at least the first hierarchy rearrange operator and the second hierarchy rearrange operator; and
generate a query result, the query result being based, at least in part, on the input including the one or more of the plurality of data objects being rearranged in the preorder traversal arrangement and in the postorder traversal arrangement.

2. The computing system of claim 1, wherein the input including the one or more of the plurality of data objects comprises a streaming flow of the one or more of the plurality of data objects.

3. The computing system of claim 2, wherein execution of at least one of the first hierarchy rearrange operator and the second hierarchy rearrange operator included in the executable query plan may at least commence before a complete set of the plurality of data objects comprising the streaming flow is received.

4. The computing system of claim 2, further comprising storing a tuple of the input on an internal stack and unwinding the internal stack when one of respective descendants and ancestors of the input have been processed, wherein the tuple comprises an ordered list of one or more of the plurality of data objects, and the unwinding the internal stack comprises removing one or more of the plurality of data objects from the internal stack.

5. The computing system of claim 1, wherein a runtime complexity for execution of at least one of the first hierarchy rearrange operator and the second hierarchy rearrange operator included in the executable query plan is represented by a linear relationship.

6. The computing system of claim 1, further comprising:
determining, prior to executing at least the one of the first hierarchy rearrange operator and the second hierarchy rearrange operator included in the executable query plan, whether one of the plurality of data objects of the input is a root node; and
using the determination of whether one of the plurality of data objects of the input is a root node to determine an ordered arrangement of the input.

7. A non-transitory computer-readable medium storing instructions, the medium comprising:
instructions to receive a query against a plurality of data objects, wherein the plurality of data objects are stored in at least one table, the table comprising a plurality of rows and at least one column, each of the plurality of rows being associated with a node of a hierarchy indexing scheme, and one of the at least one column representing a position of a row's associated node within the hierarchy indexing scheme, and the plurality of data objects are sorted, at least conceptually, to follow a hierarchical order of the hierarchy indexing scheme and support a preorder traversal arrangement and a postorder traversal arrangement;
instructions to translate the query into an executable query plan, the executable query plan including at least a first hierarchy rearrange operator and a second hierarchy rearrange operator, the first hierarchy rearrange operator to rearrange an input including one or more of the plurality of data objects from a preorder traversal arrangement of the hierarchy indexing scheme to a postorder traversal arrangement, and the second hierarchy rearrange operator to rearrange the one or more of the plurality of data objects from a postorder traversal arrangement to a preorder traversal arrangement;
instructions to execute the executable query plan, including at least the first hierarchy rearrange operator and the second hierarchy rearrange operator; and
instructions to generate a query result, the query result being based, at least in part, on the input including the one or more of the plurality of data objects being rearranged in the preorder traversal arrangement and in the postorder traversal arrangement.

8. The medium of claim 7, wherein the input including the one or more of the plurality of data objects comprises a streaming flow of the one or more of the plurality of data objects.

9. The medium of claim 8, wherein execution of at least one of the first hierarchy rearrange operator and the second hierarchy rearrange operator operator included in the executable query plan may at least commence before a complete set of the plurality of data objects comprising the streaming flow is received.

10. The medium of claim 8, further comprising instructions to store a tuple of the input on an internal stack and unwinding the internal stack when one of respective descendants and ancestors of the input have been processed, wherein the tuple comprises an ordered list of one or more of the plurality of data objects, and the unwinding the internal stack comprises removing one or more of the plurality of data objects from the internal stack.

11. The medium of claim 7, wherein a runtime complexity for execution of at least one of the first hierarchy rearrange operator and the second hierarchy rearrange operator included in the executable query plan is represented by a linear relationship.

12. The medium of claim 7, further comprising:
instructions to determine, prior to executing at least one of the first hierarchy rearrange operator and the second hierarchy rearrange operator included in the executable query plan, whether one of the plurality of data objects of the input is a root node; and instructions to use the determination of whether one of the plurality of data objects of the input is a root node to determine an ordered arrangement of the input.

13. A computer-implemented method, comprising:
receiving a query against a plurality of data objects, wherein the plurality of data objects are stored in at least one table, the table comprising a plurality of rows and at least one column, each of the plurality of rows being associated with a node of a hierarchy indexing scheme, and one of the at least one column representing a position of a row's associated node within the hierarchy indexing scheme, and the plurality of data objects are sorted, at least conceptually, to follow a hierarchical order of the hierarchy indexing scheme and support a preorder traversal arrangement and a postorder traversal arrangement;
translating the query into an executable query plan, the executable query plan including at least a first hierarchy rearrange operator and a second hierarchy rearrange operator, the first hierarchy rearrange operator to rearrange an input including one or more of the plurality of data objects from a preorder traversal arrangement of the hierarchy indexing scheme to a postorder traversal arrangement, and the second hierarchy rearrange operator to rearrange the one or more of the plurality of data objects from a postorder traversal arrangement to a preorder traversal arrangement;
executing the executable query plan, including at least the first hierarchy rearrange operator and the second hierarchy rearrange operator; and
generating a query result, the query result being based, at least in part, on the input including the one or more of the plurality of data objects being rearranged in the preorder traversal arrangement and in the postorder traversal arrangement.

14. The method of claim 13, wherein the input including the one or more of the plurality of data objects comprises a streaming flow of the one or more of the plurality of data objects.

15. The method of claim 14, wherein execution of at least one of the first hierarchy rearrange operator and the second hierarchy rearrange operator included in the executable query plan may at least commence before a complete set of the plurality of data objects comprising the streaming flow is received.

16. The method of claim 14, further comprising storing a tuple of the input on an internal stack and unwinding the internal stack when one of respective descendants and ancestors of the input have been processed, wherein the tuple comprises an ordered list of one or more of the plurality of data objects, and the unwinding the internal stack comprises removing one or more of the plurality of data objects from the internal stack.

17. The method of claim 13, further comprising:
determining, prior to executing at least one of the first hierarchy rearrange operator and the second hierarchy rearrange operator in the executable query plan, whether one of the plurality of data objects of the input is a root node; and
using the determination of whether one of the plurality of data objects of the input is a root node to determine an ordered arrangement of the input.

* * * * *